Oct. 30, 1962  C. H. MAYER, JR  3,061,102
STRAINING ARRANGEMENT FOR PAINT AND SIMILAR LIQUIDS
Filed Dec. 31, 1959  2 Sheets-Sheet 1
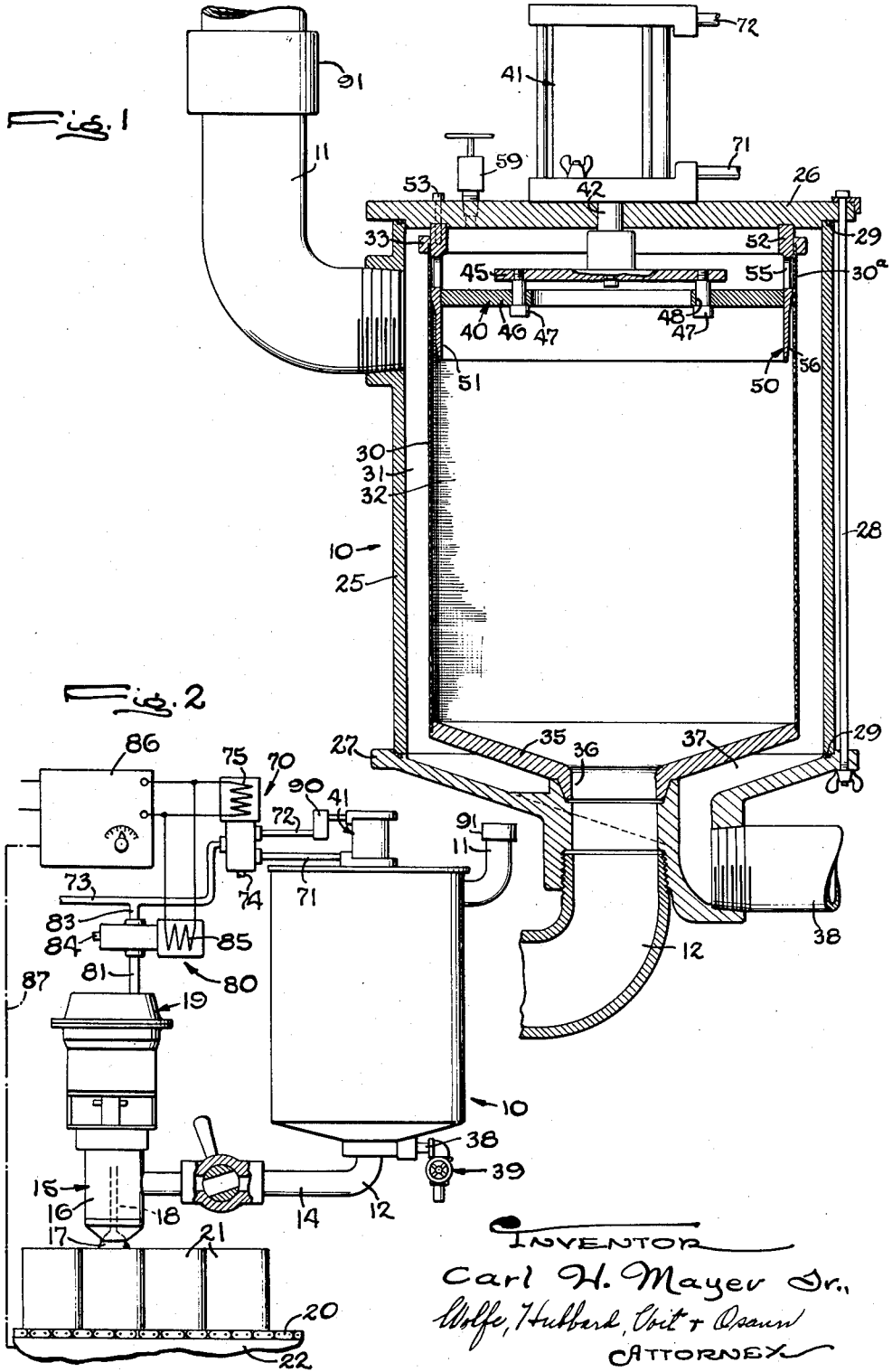
INVENTOR
Carl H. Mayer Jr.,
Wolfe, Hubbard, Voit & Osann
ATTORNEY

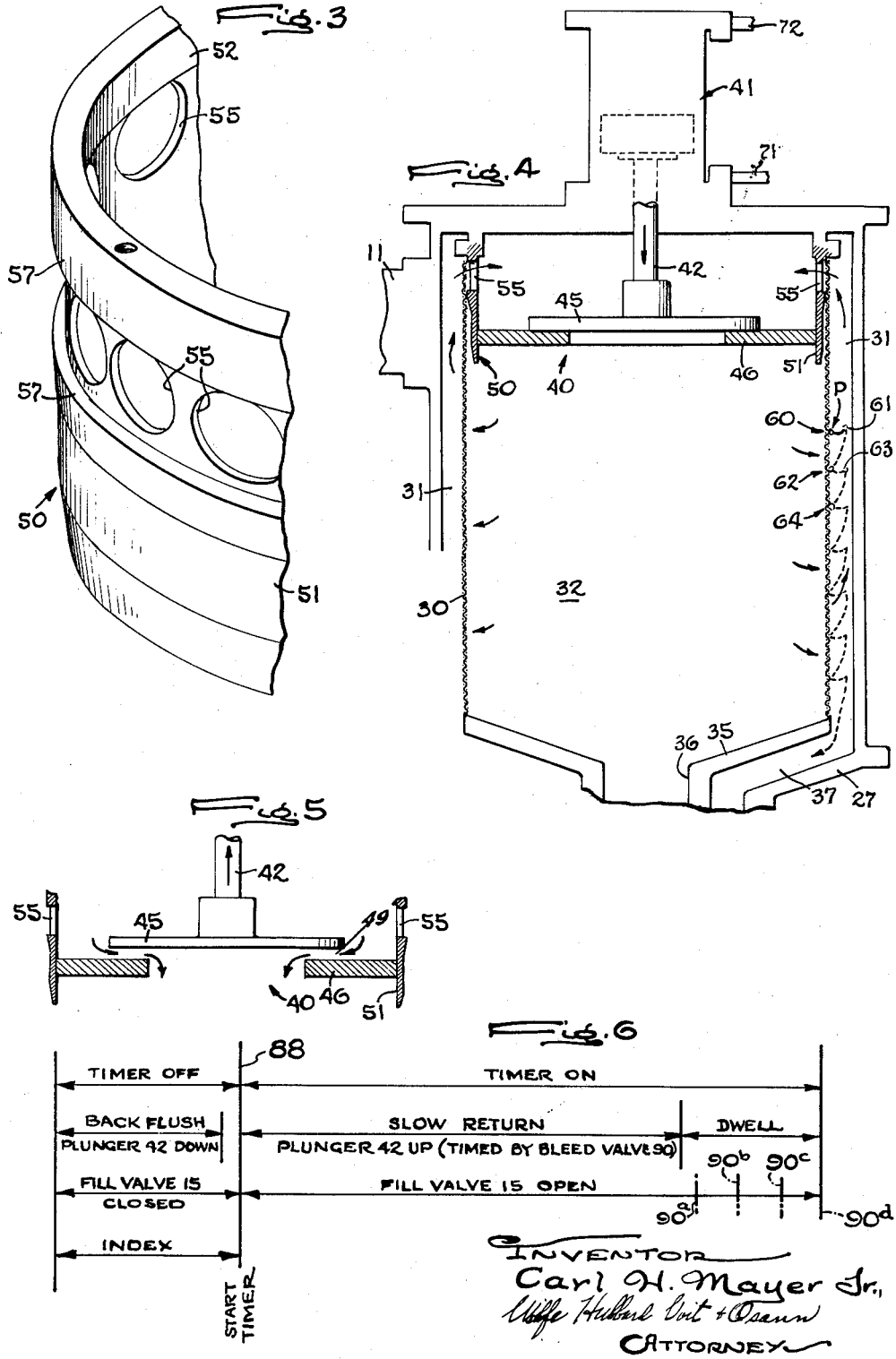

United States Patent Office 3,061,102
Patented Oct. 30, 1962

3,061,102
STRAINING ARRANGEMENT FOR PAINT AND SIMILAR LIQUIDS

Carl H. Mayer, Jr., Wilmette, Ill., assignor to Rust-Oleum Corporation, Evanston, Ill., a corporation of Illinois
Filed Dec. 31, 1959, Ser. No. 863,294
6 Claims. (Cl. 210—142)

The present invention relates to strainers and more particularly to a straining arrangement for removing solid particles from paint or the like and which is particularly suited for use in a paint can filling machine.

In the filling of paint cans in both automatic and manually controlled filling machines, means are usually provided for removing solid particles, chips of dried paint from the mixing vat, "skins" and the like, before the paint goes into the cans. This has been accomplished with various designs of strainers, usually including a screen plus means for periodically removing the collected material, for example, by means of a scraper blade. However, it is found that the performance of such conventional strainers is unsatisfactory since most of the particles are not solid but semi-solid; thus, the large particles tend to be mechanically broken down by the action of the strainer itself into smaller particles which are capable of getting through the screen or wedging into the openings in the screen so that the screen quickly tends to become clogged. In a quantity production line when the total quantity of foreign matter to be disposed of is high, the filling machinery must be shut down at frequent intervals for cleaning or replacement of the strainer in order to maintain acceptable efficiency and liquid handling capacity.

It is an object of the present invention to provide a strainer particularly suited for use with paint, which may be operated on a high production basis for long periods of time, and which is capable of continuously disposing of large amounts of solid material without loss of efficiency or capacity. When handling paint of a given color on a continuous basis the strainer may be operated shift after shift indefinitely, requiring only the draining of the collected particles from the sump from time to time and without requiring shutdown for removal of the screen.

It is another object to provide a strainer in which the strained particles are not acted upon by a blade or other mechanical element. It is a related object to provide a strainer with a cyclical flushing action but in which the semi-solid particles and "skins" are treated gently so that there is no tendency for the particles to break down into troublesome particles capable of clogging or passing the screen.

More specifically it is an object to provide a strainer in which a plunger is employed for momentarily reversing the flow or "back-flushing" thereby to unseat any particles held on the screen but in which the action is undirectional so that during the remaining portion of the cycle there is no induced sucking action which would tend to wedge the particles permanently in the screen openings.

It is another specific object to provide a strainer employing a cyclical reverse flushing action in combination with a vertically arranged screen, and in which the removed particles and "skins" are caused to travel progressively in successive cycles down the screen into a sump provided at the bottom.

Stated in general terms it is an object of the invention to provide a strainer in which there is a well defined path of flow for the liquid and in which there is a separate but equally well defined path of flow for the restrained solid particles terminating in a sump from which the collected material may be removed by opening a sump valve from time to time. It is another object to provide a strainer which back-flushes the liquid but which has a "pulsating" rather than "pumping" action, with the back-flush portion of the cycle being sufficiently short so that the particles are reversely transported only a short distance from the screen and, once dislodged, are carried downwardly into the sump by the combined action of gravity and the normal flow of the liquid toward the outlet of the device.

It is another object of the invention to provide a strainer which is automatically self cleaning to the extent that it may be employed reliably on a high volume basis by inexperienced personnel without necessity for following any particular operating precautions and without any exercise of any care or attention.

It is still another object of the present invention to provide a strainer which employs moving parts but in which there is substantially no wear on any of the parts enabling the strainer to operate on a continuous basis year after year without perceptible wear and without requiring replacement of any of the moving parts.

It is a further object to provide a strainer which in spite of its unusual capabilities is nevertheless simple, employing a minimum number of simply formed moving parts and which may be easily and quickly disassembled when disassembly becomes necessary for the purpose of inspection or the like.

It is yet another object to provide a strainer in which the flow from inlet to outlet may be either interrupted or continuous, making the device suitable for use in substantially any type of liquid supply system.

In one of its aspects it is an object of the invention to provide a novel combination of back-flushing strainer and fill valve operating in a coordinated fashion and under the control of common control means so that the fill valve may be timingly adjusted to deposit exactly the right quantity of liquid in a can or like without being affected by the pressure pulsations occurring in the strainer. It is a more specific object in this connection to provide an arrangement in which the fill valve is closed during the back flush interval; or, stated in other words, it is an object to provide a strainer in which the back flushing occurs during a time that no fluid is flowing through the outlet.

It is a final but nevertheless important object to provide a filling arrangement for filling paint cans or the like consisting of a close-coupled strainer and fill valve forming an integral unit including a quickly disengageable connection with an overhead supply vat and which permits quick changing of colors, convenient cleaning, and practically no wastage of paint at the end of the row. The system drains practically dry by the action of gravity above.

Other objects and advantages of the invention will become apparent upon studying the attached detail description and upon reference to the drawings in which:

FIGURE 1 is a vertical section taken through a strainer constructed in accordance with the present invention.

FIG. 2 is a diagram of a can filling system employing a novel combination of filter and fill valve.

FIG. 3 is a fragmentary view showing a portion of the cylinder in which the plunger moves.

FIG. 4 is a diagram showing the condition of the plunger valve during back flush portion of the cycle.

FIG. 5 is a diagram showing the plunger valve in the return portion of the cycle.

FIG. 6 is a timing diagram showing the coordination between the movement of the plunger and the operation of the fill valve.

While the invention has been described in connection with a preferred embodiment, it will be understood that I do not intend to limit the invention to the embodiment shown but intend to cover all modifications and alternative constructions and uses included within the spirit and scope of the appended claims.

Turning now to FIGS. 1 and 2 there is shown a strainer generally indicated at 10 having an inlet 11 and an outlet 12. The inlet 11 is connected to a vat or other source of fluid with a low pressure static head. In the production of paint this may be a storage vat located on the floor above. The purpose of the strainer 10 is to strain out solid particles, "skins" and the like from the fluid prior to discharge at the outlet. For utilizing the fluid, a fill valve or nozzle 15 is provided connected to the outlet of the strainer by a short length of line 14. This fill valve may, for example, be of a type disclosed in my co-pending application Serial No. 863,334, filed December 31, 1959, and now Patent Number 3,012,700. Briefly stated it includes a body 16 and a discharge orifice 17, with the flow being controlled by a plunger 18 which is reciprocated by a pneumatic actuator 19.

Arranged below the fill valve 15 is a conveyor 20 carrying a series of cans 21 with open tops, ready to receive the paint or other liquid. Can-to-can indexing is provided by an indexing drive indicated generally at 22. For further details of the can handling and indexing means, reference is made to co-pending application Serial No. 46,978, filed August 2, 1960.

Having understood the environment in which the strainer 10 is employed, more specific reference may next be made to FIG. 1 which shows the details of internal construction. The strainer has a cylindrical housing made up of a cylindrical shell 25, a top plate 26 and a bottom plate 27. For holding the unit together, a series of peripherally spaced tie bolts 28 are provided, the latter being received in spaced, registering holes in the top and bottom plates. Leakage is prevented by use of recessed O rings 29.

Straining is accomplished by providing a cylindrical screen 30 which serves to divide the housing into an outer annular space 31 and an inner cylindrical space 32. The screen is "sealed" with respect to the top plate by receiving it in an annular ring 33 which is anchored to means to be described. At the lower end of the cylindrical screen, the same is supported on a base cone 35 which has an opening 36 at its center communicating with the outlet 12. Between the base cone 35 and the bottom plate 27, there is an annular space 37 which serves as a sump and in which the foreign material is collected for removal. Communicating with the sump is a sump drain line 38 having a drain valve 39.

It will be apparent from what has been said thus far that liquid entering at the inlet 11 flows into the outer space 31 through the screen 30 where the straining takes place, and thence downwardly for discharge at the discharge orifice 12.

In accordance with the invention, a plunger is telescoped within the screen at its upper end and means are provided for reciprocating the plunger repetitively or cyclically in order to apply pulsations of pressure within the screen to set up a momentary back-flow of liquid through the screen for dislodgment of the solid particles collected thereon. Further in accordance with the invention means are provided for bypassing fluid around the plunger on the upward or return stroke so that the dislodged particles are not forcibly sucked back upon the screen. In the present embodiment the plunger generally indicated at 40 is provided with a pneumatic actuator 41 having an actuator rod 42 which extends axially through the top plate 26 for reciprocating the plunger through a limited range of movement. The plunger 40 is made up of a plunger disc 45 secured to the actuator rod and a plunger ring 46. Interposed between the plunger disc and plunger rod is a lost motion connection so arranged that when the plunger moves downwardly, the members 45, 46 are sealed together, whereas when the plunger is drawn upwardly, the members separate permitting fluid flow between them. The lost motion connection is conveniently provided by means of cap screws 47 arranged in a circle at the periphery of the disc 45 and received in oversize registering holes 48 formed in the plunger ring 46. Thus, except when the plunger is thrust downwardly, the plunger ring occupies the suspended position shown, being bottomed on the heads of the screws 47 by the force of gravity.

For the purpose of cooperating with the plunger 40 and for guiding the movement of the plunger ring 46, a cylinder 50 is provided. Such cylinder is in the form of a shallow collar, the lower or skirt portion 51 of which snugly surrounds the plunger ring. The upper portion 52 of the cylinder is secured to the top plate 26 by any convenient means; for example, screws 53 (FIG. 1) may be employed. For the purpose of admitting liquid into the cylinder and into the space above the plunger, the cylinder is formed with a plurality of closely spaced openings 55 (see FIG. 3). It will be apparent that liquid drawn through these openings during a portion of the operating cycle passes through the upper portion 30a of the cylindrical screen.

To prevent the cylinder from cutting off any substantial portion of the screen area, the outer surface of the cylinder is preferably under-cut as indicated at 56 and the only portion which actually contacts the screen is the outer rim or boss portion 57.

In discussing the operation it will be assumed that means are provided for controlling the actuator 41 to produce reciprocating movement of the actuator rod and plunger 40. Such means will be outlined in further detail at a later point in the discussion. It will further be assumed that when the operation starts, the strainer housing is entirely filled with paint or other liquid. To facilitate filling to the top, a bleed valve 59 is provided in the top plate 26 for bleeding out the entrapped air.

When the actuator applies a downward thrust, the body of liquid resists movement of the plunger ring 46 so that the plunger disc 45 moves downwardly into seated contact thereon as shown in FIG. 4. As the plunger continues its downward movement, it will be helpful to describe the effect of this movement upon a typical particle P. Because of the entrapment of liquid, the liquid within the screen will be momentarily caused to flow outward through the lower portion of the screen which constitutes most of its exposed area. Movement of the plunger preferably occurs with sufficient force so that the liquid is actually "impulsed" outwardly with sufficient force as to dislodge a particle P from its initial position 60 on the screen to a dislodged position 61 (see FIG. 4). As a result, the screen is momentarily cleared of all, or substantially all, of the solid particles, and these particles become free in the liquid in the outer annular space 31. In a typical strainer having a volume of two and a half gallons the plunger may be caused to complete its downward stroke in approximately one-half second. The liquid displaced during this abrupt movement is preferably only a small fraction of the total volume of the filter and, assuming the outlet is closed, the displaced liquid flows into the space above the plunger through the openings 55 formed in the cylinder 50. It will be noted that the path of the particle P from the initial point 60 to the dislodged position 61 is curved slightly upward. This is because of the flow in the space 31 is toward the openings 55.

At the end of the downward stroke of the plunger, the plunger movement is immediately reversed, so that the direction of pressure tends to be reversed. The reversal causes the plunger ring 46 to immediately separate from the plunger disc 45, creating a sizable opening 49 for idle return of the displaced liquid. This is shown in FIG. 5, the liquid flowing through the plunger being in the direction of the arrows. Since the plunger is thus effectively by-passed, little or no liquid flows through the screen 30 during the return portion of the cycle. The idle by-passing of liquid around the plunger is particularly significant because of the substantially "one way" movement of the particles P which results. That is, when the plunger is retracted upwardly, the displaced particles do not have any tendency to be sucked backwardly upon the screen and into the screen openings but are, on the contrary, left in suspension within the body of liquid as indicated at 61. Upon completion of the return stroke, the plunger again occupies the position shown in FIG. 1. Subsequent withdrawal of liquid, and the admission of fresh liquid from the vat causes the liquid surrounding the screen to move downwardly and inwardly. Thus, as a result of normal liquid flow a particle will tend to be displaced from the position 61 in the direction of the screen and if the flow through the strainer is within a normal range, such particle will be re-deposited upon the screen at a lower point 62. Moreover, it will be understood that gravity acts upon the particle so that the particle tends to be drawn back to the screen at a lower level than it occupied previously even where the flow is below normal.

When the plunger is again thrust downwardly creating momentary outward flow through the screen, the particle P is again dislodged to a position indicated at 63. As a result of normal flow of liquid through the filter during the return portion of the stroke, the particle is again brought back to the surface of the screen as indicated at 64. This process is repeated over and over again upon cycling of the actuator 41 so that the particle eventually lands in the sump 37.

While the operation has been described in connection with a small "discrete" particle, it will be understood that the procedure is especially effective with larger pieces of foreign matter, for example, the "skins" referred to above. Even though the latter may be large and rather soft they are left substantially intact and do not block or "blanket" the screen, as occurs in conventional strainers.

After several hours of operation, the particles and skins may build up within the sump to the extent that removal is called for. This is easily accomplished by simply opening the sump drain valve 39 so that the collected matter is washed downwardly. Such valve may be turned off again just as soon as the operator notes the flow of "clear" liquid, so that waste is negligible.

The screening arrangement described above has particular advantage in the paint industry since the paint flowing from the vat normally has a high proportion of particles which might be termed "semi-solid." That is to say, the particles are not hard and well defined, but upon being subjected to mechanical action they tend to rather readily break up into particles of a size which might flow through the filter screen, or which might become wedged in the screen openings, blocking the screen and making cleaning difficult. The present device is to be contrasted with prior devices since the action on individual particles is gentle, so gentle in fact, that even fragile particles do not break up but tend to remain intact until they reach the sump. In the present device there is little likelihood that the screen will become clogged with foreign matter of a size or consistency which cannot be dislodged by the pulsating action of the plunger. The net result is that when a strainer of the present design is operated with a single color of paint or the like, it may be operated over an entire shift and in some instances for days at a time without necessity for disassembling the unit for inspection and/or wire brush cleaning with solvent. Note, however, that where the device is employed for paint and where it is desired to change colors, it is a simple matter to unscrew the tie bolts 28 and to lift off the top plate 26 to expose the entire screen and interior for wiping and flushing.

The operation described above applies both to substantially continuously filtering and to systems where the flow is discontinuous because of the presence of an intermittently operated fill valve or the like. In accordance with one of the aspects of the invention, I provide a system which includes a filter and closely associated fill or metering valve with common actuating means so that the valve is closed incident to the downward thrust of the plunger and so that the fill valve is opened during the slower, return stroke of the plunger. Referring to the system diagram in FIG. 2, the actuator 41 is controlled by a four-way solenoid valve 70 having output lines 71, 72, a pressure inlet 73 and an exhaust 74. The four-way valve is of conventional type well understood by those skilled in the art and has a solenoid winding 75 for operating the valve plunger. Similarly, the fill valve 15 is controlled by a modified four-way valve 80 supplying line 81 and having a pressure inlet 83 and exhaust 84. A winding 85 reciprocates the valve plunger. The windings are preferably arranged in parallel with one another with energization controlled by means of a timer 86. The latter is indicated diagrammatically for purposes of discussion, and reference is made to co-pending application Serial No. 46,978 for a more complete disclosure of the control circuit. Briefly stated, means are provided for setting the "on" time, and the "off" time is dependent upon the time required to index a new container into position.

In order to visualize the manner in which the filter plunger and the flow valve are coordinated, reference is made to the time sequence diagram FIG. 6, time being measured along the horizontal axis. When the timer is turned "off" the flow valve is closed with its valve plunger 18 upraised. At the same time the actuator 41 is energized so that the plunger 40 is thrust downwardly as previously described. Since under such conditions, normal flow of liquid through the strainer is cut off, there is no liquid flow tending to move the particles of solid matter in the direction of the screen. Thus the plunger is fully effective to produce dislodgement of the particles from the screen, and, consequently, a plunger having only a limited stroke on the order of an inch is entirely adequate to produce the self-cleaning or back-flushing action. During the interval that the dislodgement is taking place, the cans 21 which receive the liquid may be indexed forwardly in readiness for the next opening of the fill valve 15. The indexing drive for the cans may be coupled to the timer 86 by any desired means indicated diagrammatically at 87. At the end of the indexing interval (see 88) the timer is turned "on," thus reversing the positions of the actuators 41 and 19. Specifically, the actuator 19 opens the fill valve 15 so that liquid flow takes place through the strainer. Simultaneously, the plunger 40 begins its retracting movement. Since the filling of the can 21 takes an appreciable time interval on the order of a few seconds, there is time to retract the plunger 40 slowly in order to insure that the fluid trapped above the plunger by-passes idly through the center of the plunger rather than producing sucking action at the surface of the screen. In order to slow down the retracting movement, a one-way bleed valve 90 may be interposed in the line 72 to limit the flow of exhaust air from the upper side of the actuator. In a practical case, the plunger may be caused to complete its movement over a sustained period on the order of one to two seconds. This is to be compared to a half second or less required for the downward thrust.

The net effect of the above is that the pulsations of the strainer are entirely isolated from and have no effect upon the flow characteristics of the fill valve 15. That is to say, when the plunger is thrust smartly downward, the valve is closed, and it is not necessary to take into account the additional momentary pressure resulting from the plunger in timing the discharge of the fill valve. Thus, simply setting the timer 86 for the complete filling of a given size of can with paint or other liquid of a given viscosity, it is possible to achieve a high degree of accuracy and consistency in the filling operation from can to can. This precludes the possibility of overflowing yet insures that the customer will always receive the amount of liquid that he has a right to expect.

After the can is filled, as indicated at 90a—90d in FIG. 6, depending upon the size of the can, the timer again turns "off" and the cycle is repeated for the next can in series.

It is one of the features of the present arrangement that reliable operation is secured even with inexperienced or careless personnel. Thus the operator need adhere to no special precautions in operating the system, and there is no need to clean or inspect the filter at frequent intervals. All that is necessary is the periodic withdrawal of the solid material from the sump and the timing of this is not at all critical.

One skilled in the art will have noted from the above that the device meets all conceivable requirements in the canning of paint and similar liquids, and yet the strainer and the associated system may be simply manufactured at low cost. The parts are easily formed and easily assembled and disassembled.

While the arrangement has been particularly described in connection with the canning of paint, it will be apparent that the strainer is applicable to all liquids where the final product must be free of any entrained particles. And while the device is particularly suitable for use in connection with cyclically operated flow valves, the strainer is not necessarily limited thereto but has application with advantage in continuous flow systems.

When it is desired to run a different kind of liquid, for example, a paint of different color, the entire assembly consisting of the strainer 10, the conduit 14 and the fill valve 15 is removed as a unit, and a substitute unit is installed. This requires simply the disconnection of a coupling 91 in the supply line plus the loosening of the mounting bracket which holds the unit. Quick-disconnect fitting may be provided for the air lines 71, 72 and 81. Thus, switching to a new color is a matter of only a few minutes work and the operation of the automatic canning machine is not delayed. Preferably the conduit 14 is made as short as possible to produce "close coupling" between the strainer and the flow valve so that the entire unit may be easily flushed out with solvent for use when the color of the run is again changed.

The entire system "drains dry" by gravity alone and there is substantially no wastage of "residual" liquid to be disposed of as in conventional filling arrangements, particularly where floor level pumps are used.

I claim as my invention:

1. In a strainer for straining out solid particles from a liquid, the combination comprising a cylindrical housing, a cylindrical screen in said housing secured to said housing top and bottom, an inlet opening in the wall of the housing, means providing an outlet at the bottom of said housing communicating with the inside of the cylindrical screen, a cylinder telescoped within said screen and secured to the top of said housing, the upper portion of said cylinder having a plurality of openings therein, a disc-shaped plunger snugly received in the lower portion of the cylinder, means including an actuator for reciprocating the plunger through a short axial distance, said plunger including a check valve so that upon the forward movement thereof liquid is trapped within the screen and forced outwardly of said screen thereby to dislodge solid particles on the screen while permitting entry of displaced liquid above the plunger through said openings and so that upon return movement of the plunger the liquid above the plunger is simply by-passed through the plunger without creation of any substantial pressure differential.

2. In a strainer for straining out solid particles from a liquid, the combination comprising a cylindrical housing, a cylindrical screen within said housing separating the space within the housing into an annular outer space and a cylindrical inner space, means providing an inlet at the top of said housing communicating with the annular outer space, means providing a sump at the bottom of the housing communicating with the annular outer space, means providing an outlet at the bottom of said housing communicating with said cylindrical inner space, a disc-shaped plunger telescoped within said screen at the upper portion thereof and having an actuator for reciprocating the plunger forwardly and backwardly through a small displacement so that upon forward movement positive pressure is created within the cylindrical inner space thereby causing an outward pulsation of the liquid contained therein thereby to dislodge solid particles from said screen so that the particles are free by action of gravity to fall toward said sump, and a check valve in said plunger so that upon backward movement thereof the liquid above the plunger is idly by-passed through the plunger so that the dislodged particles are not substantially sucked toward the screen.

3. In a filling machine for filling a series of cans or the like with a liquid, the combination comprising a source of liquid having a pressure head, a strainer having an inlet and an outlet with the source of liquid being connected to the inlet, a fill valve having an actuator for opening and closing the same, means connecting the fill valve with the outlet of said strainer, said strainer including a screen having a plunger adjacent thereto, an actuator connected to said plunger for moving the same through a forward stroke in which the liquid is reversely forced through said screen for back-flushing of particles lodged thereon followed by return movement, and control means for operating said actuators in unison with one another so that the fill valve is closed during the forward movement of said plunger and opened during the return movement of said plunger.

4. In a filling machine for filling a series of cans or the like with a liquid, the combination comprising a source of liquid having a pressure head, a strainer having an inlet and an outlet with the source of liquid being connected to the inlet, a fill valve having an actuator for opening and closing the same, means connecting the fill valve with the outlet of said strainer, said strainer including a screen having a plunger adjacent thereto, an actuator connected to said plunger for moving the same through a forward stroke in which the liquid is reversely forced through said screen for back-flushing of particles lodged thereon followed by return movement, control means for operating said actuators in unison with one another so that the fill valve is closed during the forward movement of said plunger and opened during the return movement of said plunger, and means for prolonging the return movement of the plunger.

5. In a strainer for straining solid particles from a liquid, the combination comprising a cylindrical housing, a cylindrical screen within said housing, said housing having an inlet opening communicating with the outside of said screen and an outlet opening communicating with the inside of said screen, a plunger telescoped in said screen and having an actuator for reciprocating the same, said plunger including a plunger disc connected to said actuator and a plunger ring arranged below said disc, means providing a lost motion connection between said plunger disc and plunger ring so that upon a downward movement of the plunger the plunger ring seals against the disc for pressing liquid outwardly through said screen and so that upon upward movement of the plunger the ring separates from the disc thereby permitting idle passage of the liquid trapped above said plunger.

6. In a filling machine for filling paint cans or the like, the combination comprising an overhead source of liquid, a strainer housing having an inlet and an outlet, said source being connected to said inlet, a screen in said housing interposed between the inlet and the outlet, a plunger arranged for reciprocating movement adjacent said screen so that when the plunger moves forwardly particles on the screen are back flushed away from said screen and having means for by-passing liquid around said plunger on the return portion of its stroke, a fill valve connected to said outlet, power actuators for operating the plunger and fill valve, common control means for controlling the same, said strainer housing and fill valve being close-coupled so that the strainer housing and fill valve form an integral unit, and a quickly disengageable connection being interposed between the inlet of the strainer housing and the overhead source so that the strainer housing and associated fill valve may be drained dry by gravity and removed as a unit for the changing of color.

References Cited in the file of this patent
UNITED STATES PATENTS 2,338,418  Forrest et al. _____ Jan. 4, 1944